Patented July 24, 1923.

1,462,771

UNITED STATES PATENT OFFICE.

WALTER O. SNELLING, OF ALLENTOWN, PENNSYLVANIA.

PHENOLIC CONDENSATION PRODUCT.

No Drawing.     Application filed May 18, 1920. Serial No. 382,359.

*To all whom it may concern:*

Be it known that I, WALTER O. SNELLING, a citizen of the United States, residing at Allentown, in the county of Lehigh and State of Pennsylvania, have invented certain Improvements in Phenolic Condensation Products, of which the following is a specification.

My invention relates to phenolic condensation products, and more particularly relates to improved synthetic resins and methods of making same.

It has long been known that phenolic bodies react at elevated temperatures with formaldehyde, preferably in the presence of certain activating bodies, to form resinlike materials which are useful for many purposes, and particularly as plastics, varnish bases, impregnating bodies, amber substitutes, etc. Phenolic condensation products made by the reaction of phenols with formaldehyde are at the present time largely used in industry, and the infusibility and chemical inertness of the completely polymerized materials have been found to give these products many advantages over the natural resins.

Up to the present time phenolic condensation products have been made by two somewhat different processes, which I will refer to as the "wet" process and the "dry" process. In the "wet" process a phenol is thoroughly admixed with an aqueous solution of formaldehyde or of a polymer of formaldehyde, preferably in the presence of an activating material such as ammonia, and the mixture is heated to bring about reaction between the formaldehyde and the phenol. The water which is present comes off during the heating, and unless high pressures are used during the final stages of the polymerizing treatment, it is impossible to obtain clear or solid masses of the condensation product. In the "dry" process an anhydrous or substantially anhydrous phenol is fused at a relatively low temperature with hexamethylenetetramine or equivalent body, and although in this case no water is present to form bubbles during the reaction, yet ammonia gas is given off in large amounts, and has the same effect as has the water in the "wet" process, of making it necessary to use high pressures during the final polymerizing operation, in order to obtain dense condensation products free from bubbles.

My invention relates to an improved method of preparing phenolic condensation products, and differs from the methods hitherto known in that no gases are produced in the course of the final polymerizing or condensing step.

In practicing my invention I use an anhydrous or substantially anhydrous phenolic body, such as ordinary phenol or carbolic acid, or a homologue such as a cresol, and I preferably divide the amount of such phenolic body into two portions. To one portion I add hexamethylenetetramine, and to the remaining material I add para-formaldehyde or other form of substantially anhydrous polymerized formaldehyde. I preferably heat the mixture of the phenolic body and the hexamethylenetetramine until a preliminary or intermediate condensation body is produced, this step giving a very fragile and brittle rosin-like material, and resulting in a part of the excess of ammonia in the hexamethylenetetramine being driven off, but still leaving some excess of ammonia present. I also preferably heat the second portion of my mixture, consisting of a phenolic body and a solid substantially anhydrous polymerized formaldehyde product, such heating being mainly for the purpose of securing thorough incorporation of the two bodies. As no accelerating or activating agent is present, little or no combination between the phenol and the formaldehyde body occurs in this step. I now mix together my two intermediate bodies, one of which contains an excess of ammonia, and the other of which contains no ammonia, in such proportions as to give a proper amount of ammonia in the mixed product. As both of my intermediate products are anhydrous, there is no water present to be driven off during the following polymerizing step, and although one of my two intermediate bodies contains an excess of ammonia, yet this excess is only such as is required by the second ammonia-free intermediate body, to act as an accelerator in connection with the reaction between the phenolic body and the formaldehyde body, the total amount of ammonia being not in excess of one-fifth of a molecular quantity to each molecule of phenol present.

Upon thoroughly mixing my two intermediate bodies I obtain a product which differs from all earlier phenolic condensation intermediate bodies in that it contains no excess of volatile material of any kind. Being made from substantially anhydrous materials it contains no water to be driven off, and as it is free from any excess of ammonia containing body, over the amount necessary to supply the ammonia required as a catalytic or accelerating body, there is also no ammonia present in free condition which can cause bubbles or porosity on further heating to bring about the final condensation of the mass.

With different phenolic bodies I use somewhat different amounts of hexamethylenetetramine and paraformaldehyde or other polymerized form of formaldehyde, but in general I employ approximately one molecule of phenol to each molecule of available formaldehyde or formaldehyde product, and I preferably use approximately four times the quantity of polymerized formaldehyde that I use of hexamethylenetetramine, although the relative quantities used depends upon the degree of heating used in preparing the phenolic body-hexamethylenetetramine intermediate product. It will be evident that the relative amounts of the two intermediate bodies, and of phenolic body, hexamethylenetetramine and para-formaldehyde which should be used, can be readily determined by calculation, since the amount of formaldehyde present in the para-formaldehyde together with the formaldehyde available in the hexamethylenetetramine must represent an amount equal to the quantity which will unite with the amount of the phenolic body present in the combined portions of the intermediates, while such amount of the hexamethylenetetramine is used in preparing the hexamethylenetetramine-phenolic body intermediate product as will supply sufficient ammonia for the combined quantities of the two intermediates which are to be used in making up the final mixture.

In making up compositions according to my present invention I find it convenient to first prepare a resinous intermediate condensation body by admixing approximately 20 parts of hexamethylenetetramine and 100 parts of an anhydrous phenol, and heating at a relatively low temperature until the two bodies have fused together, and then raising the temperature until part of the total excess of ammonia has been driven off, after which the product is poured out upon a cold surface and allowed to cool. By this means I obtain a very brittle and readily pulverized intermediate product. I next prepare my ammonia-free intermediate body by incorporating fused anhydrous phenol with anhydrous polymerized formaldehyde, and I then mix my two intermediates together in such quantities that the available formaldehyde present in the two quantities of intermediate used is just sufficient to form the desired ratio with the phenolic body present, and the amount of available ammonia in the hexamethylenetetramine-phenolic body intermediate product is just sufficient to supply sufficient ammonia to suitably activate the combined quantities of the two intermediates.

While I prefer to proceed in the manner described above, I do not wish to be confined to the exact procedure as outlined, since many modifications may be made in both materials and operations, without departing from the principle which I have described of preparing a mixture of a phenolic body, an activating body, and formaldehyde, which is free from any excess of either water or ammonia, and which accordingly does not produce volatile products on polymerization to the final reaction product. Accordingly no limitations should be understood, except such as are indicated in the appended claims.

I claim:

1. In the preparation of phenolic condensation products the process which comprises preparing an intermediate body from a phenolic body and hexamethylenetetramine, and preparing a second intermediate body from a phenolic body and anhydrous polymerized formaldehyde, and admixing these two intermediates and heating.

2. In the preparation of phenolic condensation products the process which comprises preparing an intermediate body from a phenolic body and hexamethylenetetramine, and preparing a second intermediate body from a phenolic body and anhydrous polymerized formaldehyde, and admixing these two intermediates in such proportions that the excess of ammonia in the first intermediate will just balance the deficiency in ammonia of the second intermediate.

In testimony whereof, I have hereunto subscribed my name this 17th day of May, 1920.

WALTER O. SNELLING.